United States Patent [19]
Wellman

[11] 3,985,191
[45] Oct. 12, 1976

[54] COMPACT PORTABLE WEIGHING SCALE

[75] Inventor: Lester R. Wellman, Highland Park, Ill.

[73] Assignee: Barbara F. Wellman, Highland Park, Ill.

[22] Filed: Sept. 5, 1975

[21] Appl. No.: 610,548

[52] U.S. Cl. .............................. 177/208; 73/410; 116/129 G
[51] Int. Cl.² ........................................ G01G 5/04
[58] Field of Search .................. 177/208, 209, 254; 73/410; 116/129 G, 129 H, DIG. 7

[56] References Cited
UNITED STATES PATENTS

| | | | |
|---|---|---|---|
| 1,458,920 | 6/1923 | Troll | 177/208 X |
| 3,055,219 | 9/1962 | Wilson et al. | 73/410 |
| 3,433,316 | 3/1969 | Newman | 177/208 |
| 3,842,667 | 10/1974 | Alexander et al. | 177/208 X |

Primary Examiner—Joseph W. Hartary
Attorney, Agent, or Firm—Robert W. Erickson

[57] ABSTRACT

A compact, portable weighing scale comprising a weight-bearing treadle connected to a cylindrical housing, or wand, by means of a flexible conduit. The treadle contains a sealed collapsible chamber communicating with one end of the conduit. The housing, or wand contains a collapsed bellows communicating with the second end of the conduit. When the chamber is caused to collapse, due to the weight of an object, or human upon the treadle, the bellows within the housing expands to a degree proportional to that to which the chamber has collapsed. The bellows, in turn, actuates a weight-dimensioned rotor, or scale which travels along a helically-shaped rod a distance proportional to the weight upon the treadle. The treadle is adapted to receive and store the housing and the conduit, and the thus-compacted scale is of a size convenient for carrying in a pocket, or small handbag.

21 Claims, 8 Drawing Figures

U.S. Patent  Oct. 12, 1976  Sheet 1 of 3  3,985,191
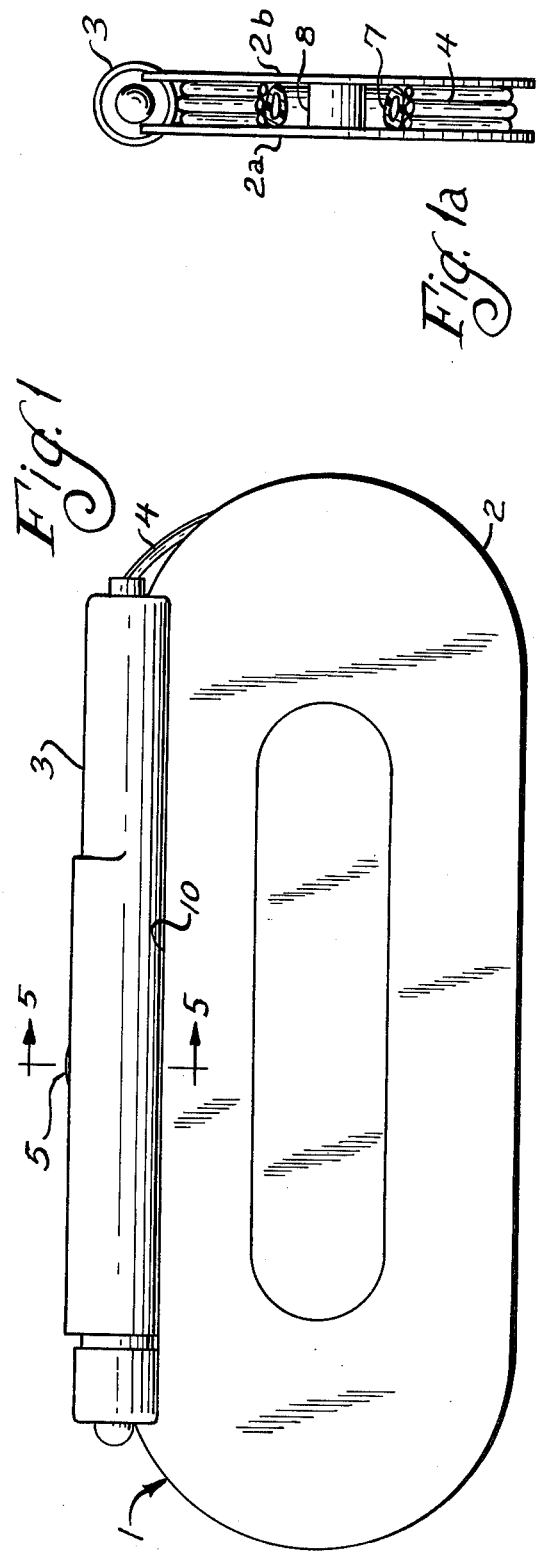
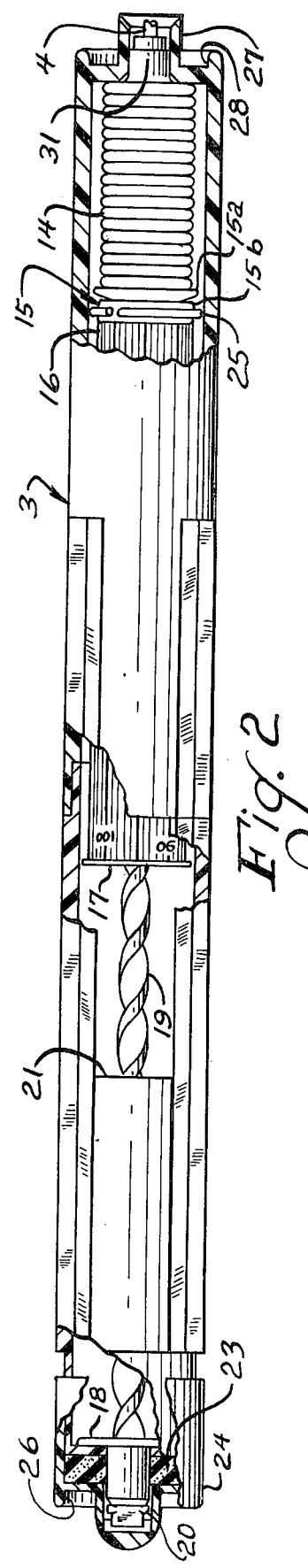

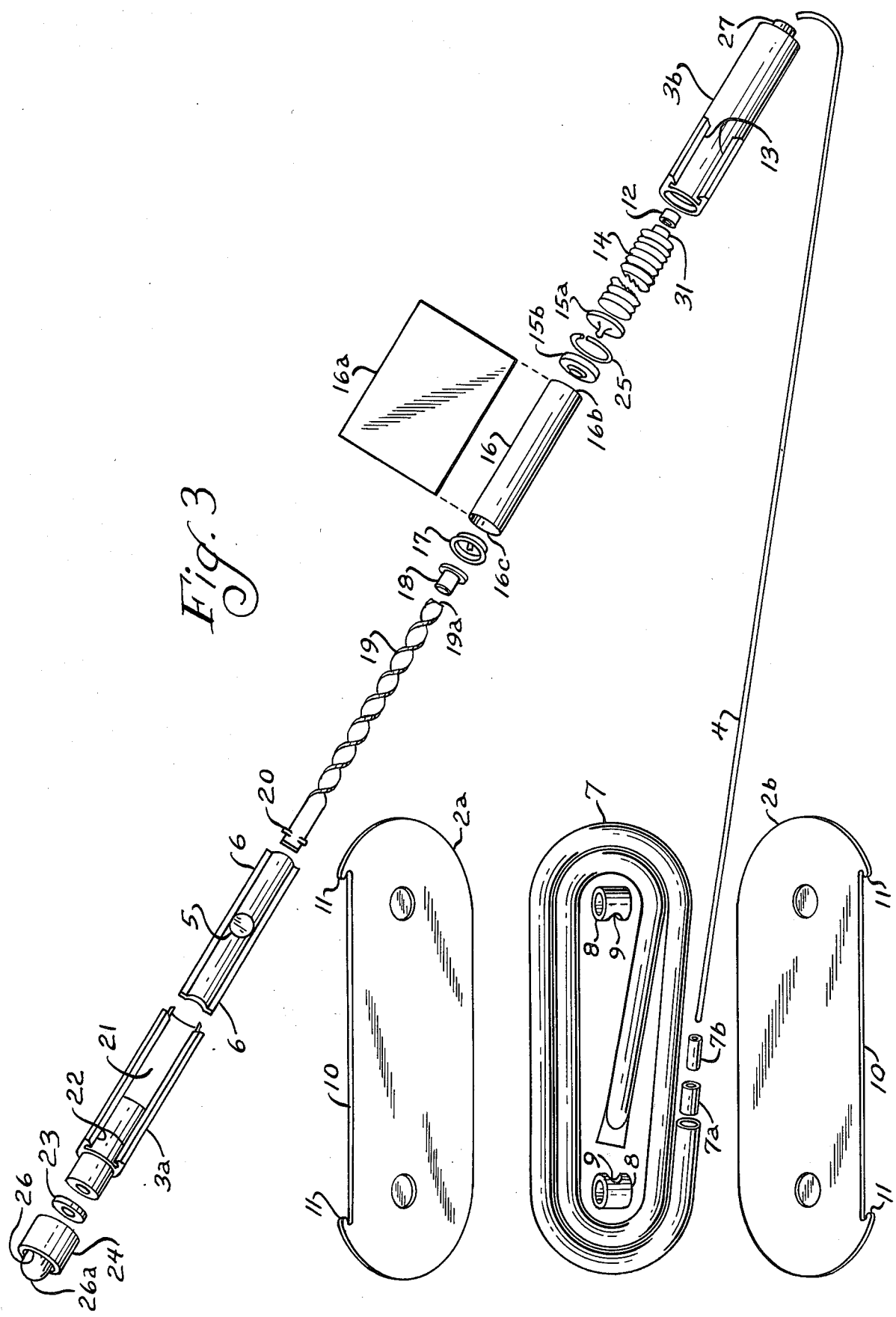

COMPACT PORTABLE WEIGHING SCALE

APPLICABILITY OF INVENTION

The present invention is directed toward a compact, portable weighing scale. More specifically, the inventive concept herein described encompasses a personal portable weighing scale of a size which affords convenient storage, or carrying in a handbag, pocket, or small suitcase. Therefore, although suitable for utilization within the household, the present "mini-scale" is ideally suited for use when away from home. Typically, the present compact, portable scale will weigh from about 3 to about 4 ounces; its approximate dimensions, when compacted for storing or carrying, are 3 inches × 7 inches × ⅝ inch. Notwithstanding its diminutive size, the scale is surprisingly accurate, for example, over a weight range of about 85 to about 285 pounds. The uniqueness of the truly portable scale of the present invention is readily apparent when compared to the wide variety of scales in every-day use. In this regard, it is understood that the present invention is specifically directed toward a scale, and not a balance such as commonly utilized in scientific laboratories, nor to precise beam scales.

Of the myriad of scales presently serving to weigh objects and humans, perhaps two are most prevalent. First, there are the computing-type scales similar to those which are found in supermarkets, butcher shops, etc. Exemplary of these is the scale described in U.S. Pat. No. 1,367,213 which involves a computing section consisting of a casing having disposed therein a rotatable cylinder. The casing contains a transparent panel which permits viewing of both price numerals and numbers which indicate the units of weight. Upon rotation of the cylinder, the various numerical columns are exposed to view through the transparent panel. The rotatable cylinder is equipped with a spirally-grooved shaft which is engaged by a pin member. The latter causes rotation of the shaft, and thus the indexed cylinder, in turn stemming from an upward or downward movement thereof as various weights are added or removed from the scale.

U.S. Pat. No. 3,637,134 is illustrative of a second prevalent type of scale, the bathroom scale. Here, a bellows is horizontally positioned between the platform and the base. Vertical movement of lever means, communicating between the platform and one end of the bellows, causes the latter to be compressed. This produces an increase in hydraulic pressure which is transmitted to a helically-coiled, or Bourdon tube connected to the second end of the bellows. An indicator, comprising a shaft and a rotating dial is connected to the second end of the hydraulic tube. The pressure increase from the bellows causes an expansion of the hydraulic tube, thereby effecting a displacement of the shaft and the indicator dial, the displacement being proportional to the downward force exerted by the weight of the object on the platform.

U.S. Pat. No. 3,433,316 is directed toward a weighing device which includes a base and a weighing platform having an air cell located therebetween. Communicating with the air cell is a flexible, elongated tube on the end of which is attached a weight-calibrated dial-type indicator. The internal construction of the latter is not disclosed; however, as with virtually all gauges of the type illustrated, the dial indicator probably contains a Bourdon tube actuated by increased pressure which, in turn, effects a circular movement of the indicating needle.

The elements constituting the present portable mini-scale, hereinafter more fully described, are not disclosed in the prior art, either in their particular combination, or in the manner in which they cooperatively function to produce the desired result. Briefly, my invention is directed toward a portable mini-scale comprising a weight-bearing treadle formed by two spaced-apart, substantially parallel surfaces and containing a collapsible chamber. Communicating with the chamber is a conduit, preferably small diameter flexible tubing, approximating six feet in length, for ease in reading at eye level. The opposite end of the conduit is connected to a housing, or wand. Within the housing is (i) a compressed bellows, communicating at one end with the second end of the conduit, (ii) a weight-dimensioned, suitably shaped scale, rotatably connected at one end to the second end of the bellows, and adapted at its other end to receive, or engage the free end of (iii) a helical rod which is movably connected at its other end to the terminus of the housing. In operation, the weight of an object, or person on the treadle collapses the chamber which causes the compressed bellows to expand in proportion. Expansion of the bellows actuates longitudinal motion of the cylindrical scale, and causes it to rotatably traverse the helically-shaped rod a distance proportional to the degree to which the bellows has expanded. The scale travels beneath an aperture in the housing, preferably fitted with a lens, and the particular weight dimension is viewed therethrough. As hereinafter described, the weight dimensions on the cylindrical scale are helically disposed to provide both accuracy and a relatively large weight range over a comparatively short distance.

OBJECTS AND EMBODIMENTS

The principal object of my invention is to provide a truly portable mini-scale. A corollary objective resides in a scale whose small size and minimal weight afford convenient storage, carrying and use. Another object involves providing a portable scale which can be conveniently used by a person who suffers from myopia.

More specifically, it is an object of the present invention to provide a portable scale having a great degree of accuracy over a relatively wide weight-range — i.e. from about 85 to about 285 pounds. Another specific object is to afford a portable mini-scale which is durable and inexpensive, and which can be used anywhere.

Therefore, in one embodiment, my inventive concept, as hereinafter delineated in greater detail, encompasses a portable weighing scale which comprises, in cooperative combination: (a) a weight-bearing treadle formed from two substantially parallel surfaces having a sealed collapsible chamber therebetween; (b) conduit means in open communication, at a first end thereof, with said collapsible chamber; (c) an elongated housing having (i) a viewing aperture intermediate its ends and, (ii) a hollow core; (d) an expandable, collapsed bellows, disposed within said core at one end portion of said housing, said bellows being in open communication, at its first extremity, with the second end of said conduit means; (e) a helical rod, disposed within said core at the second end portion of said housing, said helical rod having one free end and being connected at its other end to the terminus of said housing; and, (f) a weight-dimensioned indicating scale, disposed within said core intermediate said bellows and said helical rod, said indicating scale being rotatably connected at one end to said collapsed bellows, and adapted at its other end to engage the free end of said helical rod.

In another embodiment, the collapsible chamber is flexible tubing, as is the conduit means connecting the chamber with the collapsed bellows disposed within the housing, or wand. Furthermore, the nominal diameter of the flexible tubing forming the chamber is greater than that of the flexible tubing which serves as the conduit means connecting the housing with the treadle.

These, as well as other objects and embodiments, will become evident from the following, more detailed description of the compact portable scale encompassed by the present invention, particularly in conjunction with the accompanying drawings. In one such other embodiment, the ratio of the volume of the collapsible chamber to that of the bellows, when expanded, is in the range of about 0.8:1.0 to about 1.1:1.0.

SUMMARY OF INVENTION

The weighing scales of the prior art, some of which have previously been described, can be said to be "portable" only in the sense that they may be "hauled" from manufacturer to a location of use, or otherwise moved laboriously from one place to another. These are in great contrast to the present weighing scale which is portable in the sense that its diminutive size and shape lends itself to being carried in a pocket, handbag, or small suitcase, or being stored in a desk drawer. Therefore, the present mini-scale is well adapted for use in the home, office, on week-end trips, or extended journeys. Typically, the present scale, when compacted for carrying (the treadle serves as a receptacle for the substantially cylindrical wand), will have the approximate dimensions of 3 inches × 7 inches × ⅝ inch, and will weigh about 3 to 4 ounces. As hereinbefore stated, the end of the housing, or wand are designed to provide circular channels, or detents adapted to afford a pressure fit, being gripped by hooks, or spurs integral with notched edges of the two parallel treadle surfaces.

From the description thus far, it is evident that the present mini-scale comprises two major components, the elements of which are in open communication via conduit means; these two components are the treadle and the housing, or wand. Before continuing further, it must be stated that the precise dimensions, or sizes of the elements, as well as the specific materials of construction, do not constitute limiting features of my invention. Similarly, the particular method selected for the manufacture of the scale, from the component parts as described, or the particular weight range are not essential. Suitable alternatives, to those specifically mentioned in the present specification and the appended claims, will be rendered obvious and evident to those possessing the requisite skill in the applicable art to which this invention pertains.

Considering first the treadle, it is formed from two spaced-apart, substantially parallel surfaces which may be fabricated from polycarbonate, or other material of like toughness. A collapsible chamber is disposed between the surfaces, and may be of any suitable material capable of regaining its original shape when the weight is removed from the treadle. Suitable chambers may be toroidal, balloon-like, or in the form of a relatively long, flat bellows. With the exception of being in open communication with one end of the conduit means, the chamber is sealed. A particularly preferred chamber constitutes flexible tubing in the form of an elongated coil.

The surfaces of the treadle are maintained in their spaced-apart relation by the thickness of the collapsible chamber. Preferably, in the interest of weight-indicating practicality, at least two bushings of any suitable size and shape are disposed between the parallel surfaces. These are designed, and also fabricated from a material suitable to allow the bushings to compress and possess sufficient resiliency to permit return to the original shape. Bushings, in one form or another, are desired to inhibit lateral motion between the treadle surfaces. In order to enhance the compressibility of the bushings, a cross-section of which preferably shows a hollow core, they may be serrated around the outer periphery, or have a plurality of openings drilled therethrough. One simple technique involves partially notching each bushing at its outer periphery, and sufficiently deep to penetrate slightly the hollow interior. In this embodiment, each pair of bushings is disposed between the parallel surfaces so that the notches are facing each other. This is advantageous when the collapsible chamber is the preferred flexible tubing, since the latter can conveniently be coiled around the bushings to contact only the unnotched portion of the periphery thereof. This technique is intended to prevent the tubing from kinking.

The two parallel surfaces, generally of rounded, rectangular configuration, are notched along corresponding edges (one long edge of each), to provide means for receiving and storing the housing, or wand. These edge notches are formed, at the ends thereof, to provide hooks, or spurs which hold the wand securely to the treadle. As hereinafter illustrated, the terminal ends of the wand are provided with circular channels, or recesses adapted to receive the hooks when the housing is inserted in the receptacle means formed in the treadle. Since the preferred type of conduit means, connecting the treadle with the housing, is flexible tubing, the treadle is sized to receive and store the conduit means, as well as the wand. When both the collapsible chamber and the conduit means are in the form of flexible tubing, the nominal diameter of the former is greater than that of the latter. When intended for use, the wand is removed and only the conduit means uncoiled; the flexible tubing of the collapsible chamber is maintained within the treadle. Although the transition from the larger diameter tubing to the smaller diameter tubing may be effected in any suitable manner, it is preferred to utilize one or more "reducing couplings" manufactured from the same material as the flexible tubing. It is understood that the utilization of such reducing couplings forms no essential feature of my invention. When both the chamber and the conduit means are flexible tubing, as are any reducing couplings which might be employed, the material of construction may be any polyvinyl polymer.

As hereinbefore set forth, the wand comprises three principal elements, not including the housing itself. These are: (i) the expandable, collapsed bellows, (ii) the cylindrical, weight-dimensioned scale and, (iii) the helical rod which is engaged by one end of the scale. In using the term "expandable, collapsed bellows", in the specification and the appended claims, it is intended to describe and define a bellows which is substantially collapsed in its dwell state (no weight on the treadle).

Similarly, "helical" and "helically-shaped" are intended to be synonomous with "spiral" and "spirally-shaped". The force of the weight upon the treadle effects an expansion of the collapsed bellows which, in turn, actuates the cylindrical weight-dimensioned rotor.

The bellows may take any suitable form which results in substantial compression thereof, thus alleviating the maximum excursion of overall length without undue strain. Empirically, three diameters result in the least resistance to deflation. All convolutions have the same outer diameter, while the lesser diameters are alternated in size; these major and minor diameters, or detents tend to nest, comparatively reducing the overall length of the bellows when fully deflated, and aid in keeping the walls within their elastic limits. Additionally, the length of the bellows, when fully expanded, must be sufficient, without strain, to actuate the scale to the extent that its entire length is engaged by the helically-shaped rod. One end of the bellows is in open communication with the second end of the flexible conduit means; the second end is sealed and rotatably connected to one end of the weight-dimensioned scale. The bellows may be made from any pliable, or resilient material such as thin-walled neoprene rubber.

The helical rod is disposed within the housing at the end opposite that at which the bellows is situated. The cylindrical, weight-dimensioned scale is disposed intermediate the bellows and the helically-shaped rod. With respect to the latter, it is connected, preferably movably, but not rotatably, to the terminus of the housing. The particular means selected to connect the helical rod, whether movable, or immovable, is not important. Two suitably acceptable techniques are hereinafter described in conjunction with the accompanying drawings. Both modes of construction permit polydirectional lateral movement while simultaneously inhibiting any rotating or longitudinal motion of the helical rod. In one embodiment, the flat terminus of the helical rod contains a hole adapted to receive a pin member assembled through the end of the housing cap. In another illustrated embodiment, the end of the helical rod is provided with two swaged spurs which rest on a hollow adapter which, in turn is designed to provide a pressure fit with the housing cap's minor inside diameter and restrict the removal of the cap. Except as hereinafter stated, with respect to coaction of the weight-dimensioned rotor and the helical rod, the second end of the latter is radially "free" within the open core of the rotor.

As hereinabove stated, the bellows is rotatably connected to one end of the weight-dimensioned scale. The second end of the scale is adapted to engage the free end of the helical rod. Since the expansion of the bellows actuates the rotor, or scale, and causes it to traverse the helical rod a distance proportional to the weight on the treadle, the free end of the rod must still be engaged by the rotor when the bellows is in its compressed state. The scale can be manufactured from any suitable material such as thin-walled metal, plastic, paper, etc. In the interest of cost of manufacturing and the overall weight of the entire mini-scale, it is preferred to utilize polypropylene. The weight-dimensioned scale consists of a rotor mounting a printed sheet bearing the numerical weight designations and intermediate lines; the lengths are common, and the sheet width is substantially equal to the circumference of the rotor. The configuration of the printed sheet is such that the numerical weight indications thereon are helically disposed when the sheet is coiled around the rotor. These numerical weight designations may, of course, be indicated as pounds, or dimensioned in a metric system unit. Preferably, the "pitch" of the numerical weight designations on the scale matches the pitch of the helical rod, substantially two turns per inch, per inch. The helical disposition of the numerical designations are arithmetic rather than logarithmic, and afford the mini-scale a relatively wide weight-range readout over the comparatively short distance of travel.

With respect now to the wand, or housing, it has a hollow core, in which the bellows, rotor and helical rod are disposed, and a viewing aperture in its surface, located over the helical rod at a locus in proximity to the initial engagement thereof by the rotor. Preferably, a window, or lens is superimposed over the viewing aperture; when a lens, preferably it is one which is concave-convex. The exterior shape of the wand may be square, triangular, oblong, circular, polygonal, etc. Likewise, the hollow core may take one of these shapes, or one different from the exterior shape — i.e. the physical appearance of the wand might indicate a square in cross-section, while its core would be substantially circular. From the viewpoint of operation, appearance and manufacturing, the elements of the mini-scale are preferred to be substantially cylindrical. Manufacturing and/or assembling procedures are facilitated when the housing is initially produced in two parts. They may be such that they are ultimately joined together circumferentially, or along complementary longitudinal edges. Since this is an aspect to be considered only in manufacturing, it has no relevance to the present invention.

With respect to the aperture and the lens superimposed thereover, it is necessary for the locus thereof to be such that the numerical weight-dimensions can be viewed, by the individual as the rotor passes thereunder. A preferred viewing aperture is one which is elongated and commences at that locus of the housing proximate to that where the rotor initially engages the helical rod when the bellows is in its collapsed state. This aperture extends along the housing, toward the terminus thereof, a distance less than the length of the rotor and greater than half the distance from its origin to the terminating end of the core. To illustrate, without the intent to be limiting, where the length of the weight-dimensioned rotor approximates 2.0 inches, and the distance from the point of origin of the aperture to the terminating end of the core is about 2.5 inches, the aperture will suitably extend about 1.5 inches. At least along the length of the elongated aperture, and preferably extending beyond both ends thereof, the wand contains longitudinal ribs, or channels. Likewise, the lens is equipped with longitudinal wings of a length sufficient to completely cover the aperture regardless of the specific locus of the lens over the weight-dimensioned scale. The longitudinal wings are adapted to be movably engaged in the ribs, or channels whereby the lens is slidably connected to the housing over the entire length of the aperture. This configuration affords, as hereinafter set forth, an initial, one-time adjustment, or calibration of the scale for the particular individual using it.

The terminal end of the housing is reduced to provide a shoulder over which a housing cap is placed to seal-off the end of the core. The configuration of the outside end of the cap provides a recessed channel, or detent, adapted to engage the spurs, or hooks at the end of the notches provided in the treadle. Similarly, the opposite end of the wand is designed (i) to accommodate the connection of the conduit means to the bellows and, (ii) to provide a similar recessed channel which is engaged by the hooks on the opposite ends of the receptacle notches. It will be recognized that the use of these channels, in coaction with the hooks, affords a snug fit of the wand to the treadle edge so that the wand is not easily displaced should the scale be jarred when being carried. To facilitate removal of the wand from the treadle, the capped end is provided with a resilient, spring-like member upon which the interior of the cap seats when placed over the reduced shoulder at the terminus of the housing. Applying slight pressure, by squeezing the wand along its longitudinal axis, to compress the resilient material, is sufficient to permit the wand to be removed easily. Similarly, a like amount of pressure is all that is required to store the wand in the gap without incurring the risk of breaking the lugs. The spring-like member may be a sponge washer, or a Bellville washer, or other device having resiliency.

Further description of my invention will be made in conjunction with the accompanying drawings which illustrate the various embodiments thereof. It is believed that these drawings, in view of the foregoing discussion, will provide a clear understanding of the present mini-scale and its mode of operation.

BRIEF DESCRIPTION OF THE DRAWINGS

The portable weighing scale, encompassed by my invention, is represented by the various views illustrated in the drawings. Since these are presented for the sole purpose of illustration and additional edification, they are not to be considered as drawn precisely to scale. Furthermore, the exact dimensions and/or sizes of the components, as illustrated, are not intended to be limiting. Any number of the elements may be somewhat out of proportion with respect to any number of other elements in order to project a concise description and to convey a clear understanding.

FIG. 1 is an elevation of the portable mini-scale with the conduit means stored within the treadle and the housing, or wand inserted between the hooks into the receptacle formed by the notches in both ends at edges of the treadle surfaces.

FIG. 1a is an end view from the left-hand side of the assembled scale as shown in FIG. 1.

FIG. 2 is a broken-away, partially-sectioned, enlarged plan view of the entire housing, with the winged lens removed in order to clarify the assembled relationship of the component parts within. In this illustration, the components within the housing are shown as they exist without weight being on the treadle — i.e. the bellows 14 is substantially collapsed. Also shown is the means by which helical rod 19, having swaged spurs, or lugs 20, is movably connected to the terminus of the housing through the use of an eyelet flange 18.

FIG. 3 is an exploded view of the entire portable scale illustrating the component parts and their coacting relationship.

Figure 4:
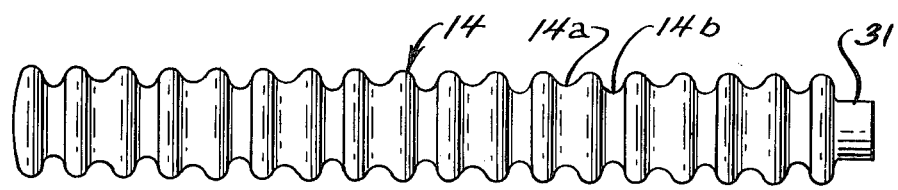
FIG. 4 is an enlarged view of the bellows to illustrate the alternating major and minor diameters.

It is believed that these figures, in addition to the description hereinbefore set forth and that in the detailed figure description which follows, are sufficient for the purpose of defining and illustrating the present invention.

DETAILED DESCRIPTION OF DRAWINGS

With specific reference now to FIG. 1, the mini-scale, indicated generally as 1, is shown in its portable configuration, with the treadle 2 having the entire housing 3 stored in the receptacle formed by notches 10 (FIG. 3) in the longitudinal edges of the parallel surfaces, (the second surface, and the notch therein are hidden in this view). Treadle 2 is sized to receive and store conduit means 4, a portion of which is shown as communicating with the interior of housing 3. Conduit means 4 is, of course, coiled between the parallel surfaces of treadle 2 prior to seating the wand 3. This view shows only a portion of hooks 11, at the ends of the treadle notches, which hold housing 3 firmly between them. These hooks are more clearly shown in the exploded view of FIG. 3.

FIG. 1a is an end view of the left side of the portable configuration shown in FIG. 1. Illustrated is the manner in which the flexible tubing chamber 7 and the conduit means 4 are stored between the surfaces 2a and 2b by being coiled around bushings 8.

Figure 5:
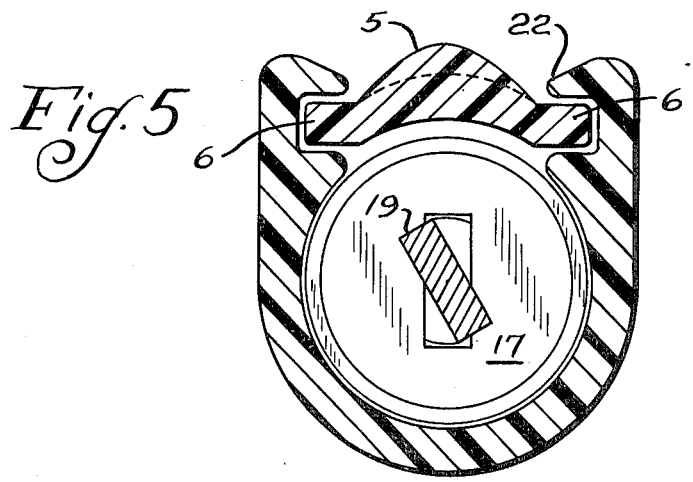
FIG. 5 is an enlarged sectional view of the housing, taken substantially along the line 5—5 of FIG. 1, in the area of the elongated aperture with the winged-lens in place.

When the scale is not in use, that is, there is no weight upon the treadle to compress the chamber and bushings, the component elements within the wand assume the configuration and relationship shown in FIG. 2. In order to clarify the internal configuration in the area of elongated aperture 21, the lens 5 and its longitudinal wings 6 have been eliminated from this partially-sectioned plan view. The winged-lens, and its relationship to the elongated aperture, are shown in FIGS. 3 and 5 hereinafter described. Conduit means 4, communicating with the collapsible chamber in the treadle, enters the housing through a small female fitting 27 which, it should be noted, forms a recessed circular channel 28 at this end of housing 3, which channel engages hooks 11 on the notched edges 10 of the treadle 2. Conduit 4 is connected and sealed to cuff, or neck 31 of bellows 14. Thus, the collapsible chamber in the treadle, the conduit means and the bellows form the enclosed, sealed system employed in the present portable scale. It should be noted that bellows 14 is compressed in this view.

Bellows 14 is rotatably connected to the weight-dimensioned rotor 16 by means of a bearing 15. The latter, as shown in the exploded view of FIG. 3, is formed from a male member 15a, to which bellows 14 is connected, and a female member 15b, to which the end 16a of rotor 16 is connected. In a preferred construction, a ring bearing 25 is mounted on member 15b, the rotor bearing. Its function is to guide the advancing end of bellows 14 and the trailing end of rotor 16 within the core of wand 3. Rotor 16 is supplied with a weight-dimensioned scale 16a, of substantially the same length as the rotor; it has a width substantially equal to the circumference of the rotor, and is cemented thereon.

The numerical weight indications are, therefore, helically disposed upon rotor 16. The open end of the rotor is equipped with slotted washer 17, in order to adapt rotor 16 to engage the free end of helical rod 19.

The other end of helical rod 19 is connected, preferably movably, to the housing cap 24. One suitable technique, for permitting some polydirectional lateral motion, while simultaneously inhibiting longitudinal, or rotating motion, is shown. The helical rod 19 extends through housing 3 into housing cap 24; the swaged spurs 20 seat on the leading edge, or barrel of eyelet 18 which is cemented to the interior of the narrow end 26a of housing cap 24. Prior to placing cap 24 over the reduced end of wand 3, a washer 23, of resilient, spring-like material, is trapped by the end of wand 3. When cap 24, having a recessed, circular channel 26, is placed over the reduced shoulder end of housing 3, the resilient material abuts the interior of the housing cap. By applying pressure to the end of the housing and cap, the length of the assembly is slightly reduced to the extent that it may be readily inserted into the treadle hooks, or spurs. The resiliency of the spring-like member is sufficient to maintain the wand in the treadle securely, and also to facilitate its removal when intended to be used. When in use, the force upon the treadle causes bellows 14 to expand and actuate longitudinal motion of rotor 16, and causes it to rotatably traverse helical rod 19 a distance proportional to the weight upon the treadle. Since the numerical weight dimensions are helically disposed on the rotor, only a relatively short distance is needed to afford a comparatively wide weight range.

FIG. 3 is an exploded view of the various component parts, or elements of the present weighing scale, with the wand 3 having been divided circumferentially into approximate halves 3a and 3b. It is believed that this assists in clarifying the presentation as contrasted to having the housing divided along a longitudinal axis such that the two halves are semi-circular in cross-section. Referring now to the drawing, it is seen that treadle 2 is formed from two surfaces 2a and 2b. The compressible chamber is shown as being a coil of flexible tubing 7. Bushings 8, each containing a notch 9 are disposed between surfaces 2a and 2b in a manner such that the notches are facing each other, and tubing 7 is coiled around the un-notched periphery thereof. The treadle surfaces are notched along corresponding edges 10 in a manner to provide hooks 11 at each end of the notched surfaces. It will be seen that the treadle is adapted to provide storage for wand 3. The terminating end of chamber 7 is sealed to one end of flexible conduit 4 through the utilization of reducing couplings 7a and 7b. The use of two reducing couplings, in sealing the compressible chamber 7 to flexible conduit means 4, is preferred since the resulting "joint" will possess enhanced flexibility.

The other end of the flexible conduit 4 is inserted into the lower half 3b of the housing through the small female end 27 thereof. Adapter 12 is utilized to reduce the terminal cuff 31 of bellows 14 to facilitate the connection of the flexible conduit with the bellows. The closed end of bellows 14 is connected to the male half 15a of the bearing. The connection is made with the female half 15b, having ring bearing 25 connected around its periphery, and bearing half 15b is immovably connected to end 16b of rotor 16. Bearing 15 is utilized to convert the longitudinal motion imparted by bellows 14 into a rotating motion as the rotor 16 traverses the helical rod. Element 16a in the drawing is the weight-dimensioned scale prior to its being coiled around rotor 16. The details of the weight-dimensioned scale are shown in accompanying FIG. 7.

The open end 16c of rotor 16 is adapted, by way of slotted washer 17, to engage the free end 19a of helical rod 19. As hereinbefore set forth, the free end of helical rod 19 must be engaged by the rotor when the bellows is in its collapsed state.

Prior to initially engaging rotor 16, via slotted washer 17, helical rod 19 passes through eyelet 18 to the extent that lugs 20 are caused to seat on the leading edge, or barrel thereof. The spurred end of helical rod 19 and the barrel of eyelet 18 passes through the reduced shoulder end of the upper housing half 3a, through the resilient spring-like member 23, and is caused to seat within the reduced narrow end of housing cap 24.

Considering now the two halves 3a and 3b of housing 3, when they are connected, ribs 13 of half 3b and ribs 22 of half 3a are adapted to coincide. Thus, there is formed side channels designed to receive wings 6 of lens 5, whereby the latter is slidably movable in the area of elongated slot 21.

FIG. 4 is an enlarged view of bellows 14, showing open end cuff portion 31 which is adapted to receive the end of flexible tubing 4. As illustrated herein, bellows 14 consists of alternating major diameters 14a and minor diameters 14b. This particular bellows configuration enhances the compressibility characteristics of the bellows.

FIG. 5 is a sectional view of housing 3 taken substantially along the line 5—5 of FIG. 1, in the area of elongated aperture 21 with the winged-lens superimposed thereon. This view clearly illustrates the adaptability of the wings 6 to engage guide channels, or ribs 22, whereby lens 5 is slidably connected to housing 3 over the entire length of elongated aperture 21. Also illustrated is the slotted washer 17 which engages the free end of helical rod 19.

Figure 6:
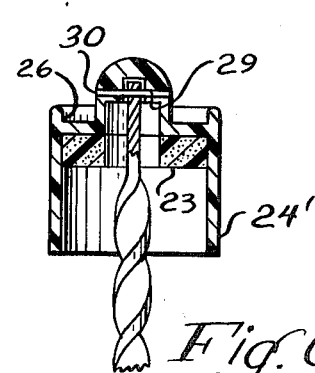
FIG. 6 is an enlarged, partially-sectioned view of housing cap 24, and illustrates an alternative embodiment where the helical rod is movably connected by way of pin 30.

FIG. 6 is a partially sectioned view of housing cap 24 and illustrates an alternative embodiment wherein the helical rod 19 is movably connected to the housing cap 24 by way of pin 30 assembled through the housing cap and pin hole 29 in the flat end of helical rod 19.

Figure 7:
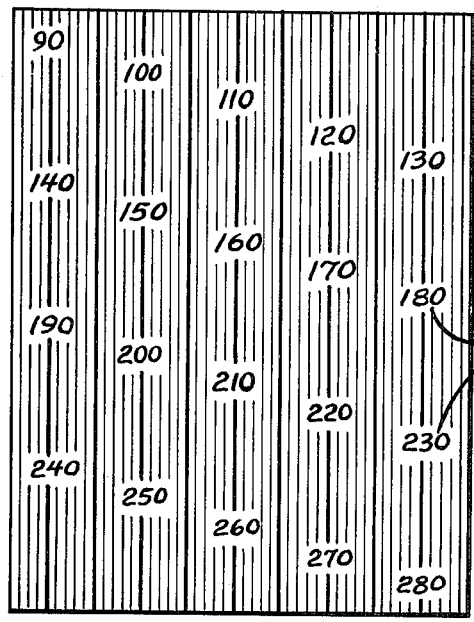
FIG. 7 is an enlarged plan view of the weight-dimensioned scale 16a prior to its being coiled around rotor 16.

FIG. 7 is an enlarged plan view of the weight-dimensioned scale 16a prior to its being cemented around rotor 16. This view is presented to show clearly the helical disposition of numerical weight indications 32.

When an individual, whose weight is then known, is about to use the scale for the first time, he removes the wand and the flexible conduit from the treadle which is then let down to any flat, hard surface. He settles the balls of his feet, with or without shoes, evenly upon the treadle and lifts his heels slightly to center all his weight thereon. Holding the wand at eye level, he taps the same until all motion stops, and slides the lens up, or down the elongated slot until he views his known weight. An additional side-to-side adjustment is available via slight rotation of the housing cap. The scale is then calibrated for this individual. In order for two people to use the same scale, an arrow, or other indicia is placed on the wings just below the lens, and bench marks are made on the housing, one for each individual.

One suitable method for manufacturing the present scale involves assembling the treadle and the wand, with the conduit means in sealed, open communication with the bellows. The treadle is subjected to a force sufficient to compress the flexible chamber and bushings. The conduit is then connected to the chamber. When the force is removed from the treadle, the chamber expands to its original shape which causes the bellows to attain its collapsed state.

The foregoing specification, particularly when read in light of the accompanying drawings, is believed to present a concise definition and clear understanding of the present portable weighing scale, the scope and spirit of which is defined in the appended claims.

I claim as my invention:

1. A portable weighing scale which comprises, in cooperative combination:
   a. a weight-bearing treadle formed from two substantially parallel surfaces having a sealed, collapsible chamber therebetween;
   b. conduit means in open communication, at a first end thereof, with said collapsible chamber;
   c. an elongated housing having (i) a viewing aperture intermediate its ends and, (ii) a hollow core;
   d. an expandable, collapsed bellows, disposed within said core at one end portion of said housing, said bellows being in open communication, at its first extremity, with the second end of said conduit means;
   e. a helical rod, disposed within said core at the second end portion of said housing, said helical rod having one free end and being connected at its other end to the terminus of said housing; and,
   f. a weight-dimensioned indicating scale, disposed within said core intermediate said bellows and said helical rod, said indicating scale being rotatably connected at one end to said collapsed bellows, and adapted at its other end to engage the free end of said helical rod.

2. The scale of claim 1 further characterized in that said elongated housing is substantially cylindrical.

3. The scale of claim 1 further characterized in that said helical rod is movably connected to the terminus of said housing.

4. The scale of claim 1 further characterized in that said collapsible chamber is flexible tubing.

5. The scale of claim 1 further characterized in that said conduit means is flexible tubing.

6. The scale of claim 5 further characterized in that said treadle is (i) sized to store said flexible tubing conduit and, (ii) adapted to receive and store said housing.

7. The scale of claim 6 further characterized in that corresponding edges of said treadle surfaces are notched to provide a storage receptacle for said housing.

8. The scale of claim 1 further characterized in that the ratio of the volume of the collapsible chamber to the volume of the collapsed bellows, when expanded, is within the range of about 0.8:1.0 to about 1.1:1.0.

9. The scale of claim 1 further characterized in that the core of said elongated housing is substantially circular in cross-section.

10. The scale of claim 1 further characterized in that said weight-dimensioned indicating scale is cylindrical.

11. The scale of claim 1 further characterized in that the weight dimensions of said indicating scale are helically disposed thereon.

12. The scale of claim 11 further characterized in that the helical pitch of the weight-dimensioned indicating scale is substantially equal to the pitch of the helical rod.

13. The scale of claim 1 further characterized in that the length of the bellows, when expanded, is sufficient to cause the entire indicating scale to be engaged by the helical rod.

14. The scale of claim 1 further characterized in that a lens is superimposed over said aperture.

15. The scale of claim 1 further characterized in that said collapsible chamber and said conduit means are both formed from flexible tubing, and the nominal diameter of the former is greater than the nominal diameter of the latter.

16. The scale of claim 4 further characterized in that at least two bushings are disposed between said parallel surfaces and said flexible tubing is coiled around said bushings.

17. The scale of claim 16 further characterized in that said bushings are collapsible.

18. The scale of claim 17 further characterized in that said bushings are partially notched, in the outside periphery thereof, and spaced apart between said parallel surfaces such that said notches face each other.

19. The scale of claim 1 further characterized in that said aperture is elongated.

20. The scale of claim 19 further characterized in that a lens, equipped with wings, is superimposed over said aperture, said wings adapted to engage said elongated aperture.

21. The scale of claim 20 further characterized in that (i) the housing contains guide channels along the length of said elongated aperture and, (ii) the wings of said lens are adapted to engage said guide channels, whereby said lens is slidably connected to said housing over the entire length of said elongated aperture.

* * * * *